United States Patent [19]

Moopenn et al.

[11] Patent Number: 4,807,168
[45] Date of Patent: Feb. 21, 1989

[54] HYBRID ANALOG-DIGITAL ASSOCIATIVE NEURAL NETWORK

[75] Inventors: Alexander W. Moopenn; Anilkumar P. Thakoor, both of Pasadena, Calif.; John J. Lambe, Redmond, Wash.

[73] Assignee: The United States of America as represented by the Administrator, National Aeronautics and Space Administration, Washington, D.C.

[21] Appl. No.: 60,201

[22] Filed: Jun. 10, 1987

[51] Int. Cl.[4] .......................... G06J 1/00; G06G 7/12; G06G 7/122; G11C 15/04

[52] U.S. Cl. .................................... 364/602; 307/201; 364/600; 364/800; 364/807; 364/900; 365/49

[58] Field of Search ... 364/600, 602, 513, 200 MS File, 364/900 MS File, 800, 807, 135; 307/201; 365/49

[56] References Cited

U.S. PATENT DOCUMENTS

| | | | |
|---|---|---|---|
| 3,950,733 | 4/1976 | Cooper et al. | 340/172.5 |
| 4,084,260 | 4/1978 | Fleming et al. | 364/900 |
| 4,254,474 | 3/1981 | Cooper et al. | 364/900 |
| 4,326,259 | 4/1982 | Cooper et al. | 364/715 |
| 4,660,166 | 4/1987 | Hopfield | 364/807 |
| 4,737,929 | 4/1988 | Denker | 364/807 |

OTHER PUBLICATIONS

A. Moopenn, et al., "Neural Networks for Computing," AIP Conf. Proceedings 151, p. 315, Snowbird, Utah (1986).

J. Lambe et al., "Electronic Device Aspects of Neural Network Memories," American Institute of Aeronautics and Astronautics, Oct. 21-23, 1985, pp. 160-166.

A. Moopenn, et al., "Electronic Implementation of Associative Memory Based on Neural Network Models," IEEE Trans. Man, and Cybernetics, (1987).

Primary Examiner—Jerry Smith
Assistant Examiner—Stephen M. Baker
Attorney, Agent, or Firm—Thomas H. Jones; Paul F. McCaul; John R. Manning

[57] ABSTRACT

Random access memory is used to store synaptic information in the form of a matrix of rows and columns of binary digits. N rows read in sequence are processed through switches and resistors, and a summing amplifier to N neural amplifiers in sequence, one row for each amplifier, using a first array of sample-and-hold devices S/H1 for commutation. The outputs of the neural amplifiers are stored in a second array of sample-and-hold devices S/H2 so that after N rows are processed, all of said second array of sample-and-hold devices are updated. A second memory may be added for binary values of 0 and −1, and processed simultaneously with the first to provide for values of 1, 0, and −1, the results of which are combined in a difference amplifier.

10 Claims, 3 Drawing Sheets

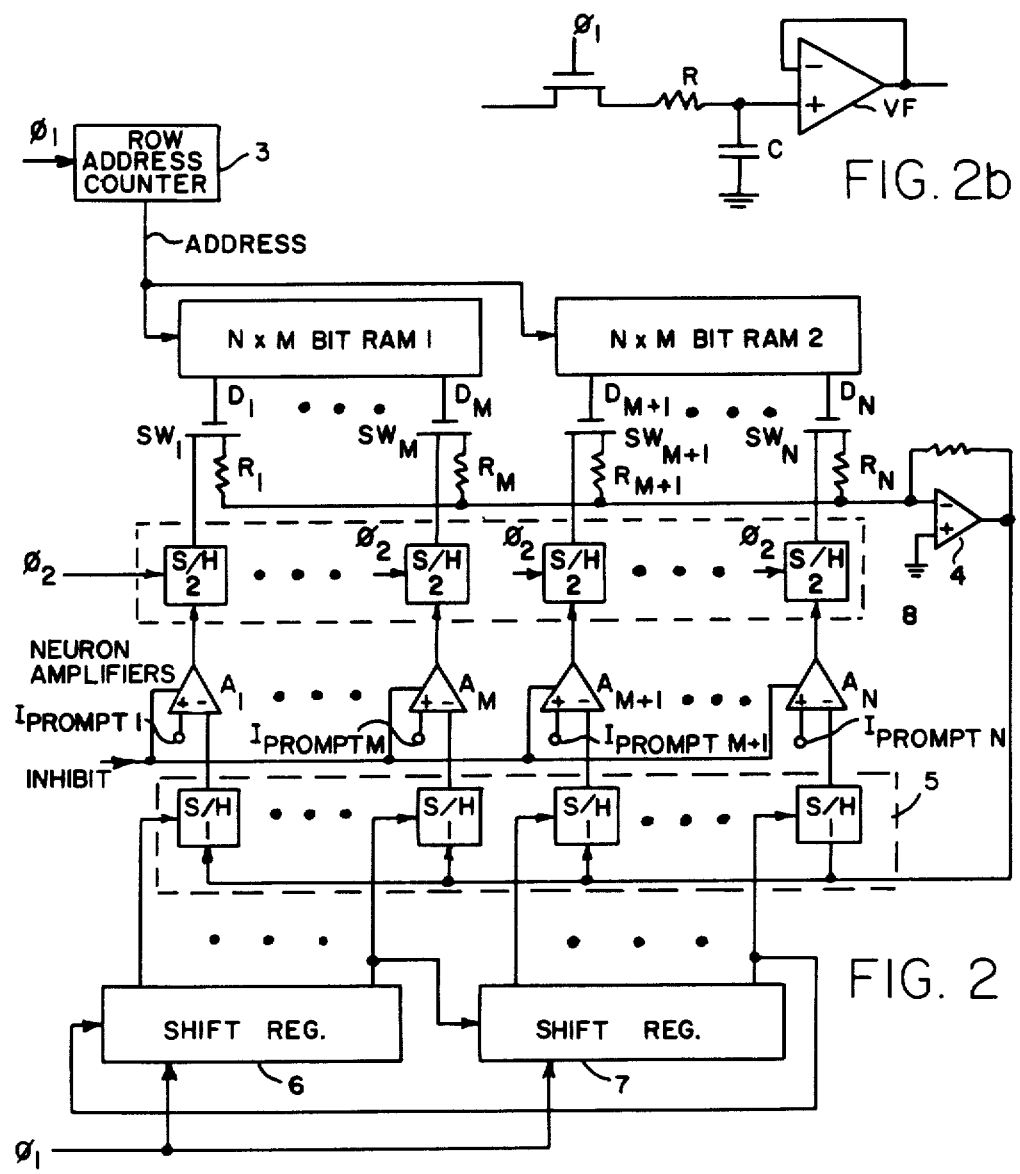
FIG. 2b
FIG. 2
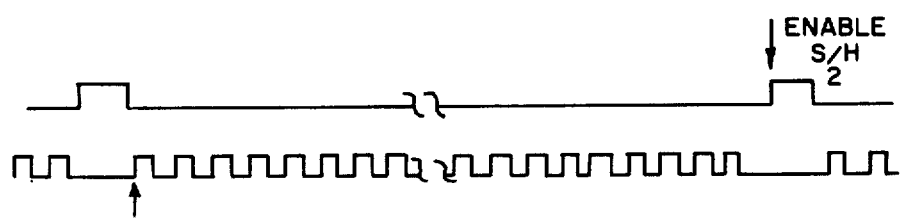
FIG. 2a

HYBRID ANALOG-DIGITAL ASSOCIATIVE NEURAL NETWORK

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

This invention relates to an analog-digital hybrid neural network realization of associative memories and collective computation systems based on the Hopfield model disclosed in U.S. Pat. No. 4,660,166.

The Hopfield model shown in FIG. 1 in its simplest form defines the behavior of a state vector V as a result of the synaptic interactions between its components $I_1$-$I_n$ using a matrix of row and column conductors, where the columns (or rows) are driven by neuron amplifiers $A_1$-$A_n$ with feedback from rows (or columns) through synapses at intersections between the rows and columns. Connections are selectively made through resistors R by switches SW to store synaptic information in the matrix. The value of each resistor R is preferably selected for the problem at hand, but may be made the same for every synaptic node thus created. Each amplifier drives the synaptic nodes (resistors) to which the amplifier output is connected by column conductors, and receives feedback from every synaptic node to which a row conductor is connected. Each amplifier thus acts as a neuron capable of feeding back to all other neurons through synaptic nodes connected to the neuron output by a resistor R. The final output of the neuron amplifiers is a set of voltage signals that represents a stored word which best matches an input word consisting of a set of signals $I_{PROMPT\ 1}$ through $I_{PROMPT\ N}$.

A neural network having a 32×32 matrix of synapses has been implemented for research purposes with electronic switches and resistors of equal value for all synaptic nodes, and using analog amplifiers with an inhibit input for control of its threshold. It would be desirable to expand the network to a much larger matrix, such as 1000×1000, but such a large network would require too many switches and resistors.

In the continuing research effort into associative memories and collective computation systems based on the Hopfield model, the need has arisen for a research network utilizing hardware that can offer higher operating speeds than is presently obtainable through computer simulation, and that can be easily scaled upwards, e.g., scaled up from 32 to 1000 or more neurons. Software simulations, while proving a concept and verifying the basic operating principles of the Hopfield model, suffer from intrinsic speed limitations as compared to the expected speed (cycle time) of neural networks embodied in hardware. Thus, in order to research the properties and requirements of neural network associative memories and computers, programmable, flexible, and easily expandable neural networks using state-of-the-art techniques and components are required.

SUMMARY OF THE INVENTION

In accordance with the present invention, an analog-digital hybrid network utilizes a block of N×N random access memory (RAM) for storing a matrix of binary synaptic information, a linear array of N analog amplifiers for performing the neuron function, an array of N electronic switches, one switch for each column of the synaptic information matrix for connecting the neuron amplifier feedback signal to a single row conductor, which connects to all of the neuron amplifiers through a summing amplifier, and two arrays of N sample-and-hold means, a first array for integrating, sampling and holding the output signal of the summing amplifier for each row as an input to each of the neuron amplifiers, and a second array of nonintegrating sample-and-hold devices for holding the respective neuron amplifier output signals for a complete matrix cycle to the synaptic switches. A microcomputer addresses the ROM to present to the synaptic switches one row of synaptic data at a time from the matrix. Thus, the feedback from successive rows of synaptic information produced is distributed to the first array of integrating sample-and-hold devices sequentially where they are stored as inputs to the neuron amplifiers until all rows of synaptic information in the RAM have been stored. Then the outputs of the neuron amplifiers are stored in the second array of sample-and-hold devices. The first array of sample-and-hold devices thus smooths the feedback for each column signal from the summing amplifier of all rows, and the second array holds the feedback signals from all rows of synaptic information. The microcomputer may read out the signals from the second, nonintegrating array of sample-and-hold devices as the output of the neural network once all of the rows of synaptic information stored in the RAM have been processed through a sufficient number of matrix cycles for the output to stabilize. A second RAM, a second row of synaptic switches, and a second summing amplifier may be provided, and the difference between the two amplifiers is generated by a differential amplifier. That difference is then used as the feedback to the neuron amplifiers. In that way each bit of synaptic information need not be limited to two levels, 1 or 0, but may be trilevel, 1, 0 or −1. This synaptic network may easily be expanded from, e.g., 32×32 to 1000×1000 by merely substituting larger RAMS and extending the synaptic hardware linearly from 32 to 1000 synaptic switches, neuron amplifiers, and sample-and-hold devices for each column of synaptic information.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a schematic diagram of a neural network computer embodying the architecture of the present invention from binary synaptic data bits of 1 and 0, FIG. 2a is a timing diagram for the operation of the network of FIG. 2, and FIG. 2b is a schematic circuit diagram for integrating sample-and-hold (S/H) devices used in a first array of S/H devices.

DESCRIPTION OF PREFERRED EMBODIMENTS

Figure 1:
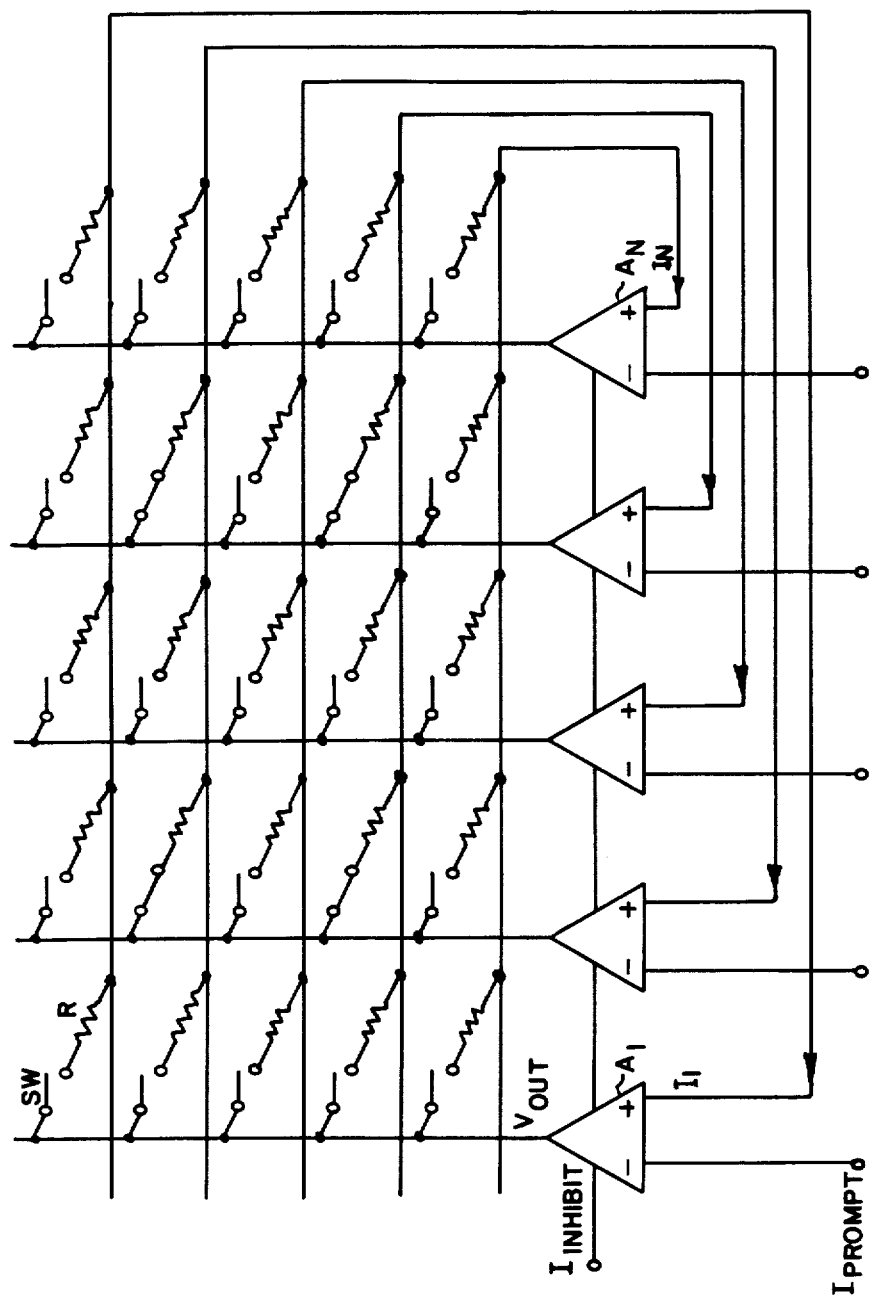
FIG. 1 is a schematic diagram of a synaptic network with a matrix of switches and resistors for selecting the synaptic nodes, and five neuron amplifiers, in with the prior art.

Referring first to the prior art FIG. 1, it may be appreciated that as the size of the network is expanded to N×N, where N may be 1000 or larger, the number of switches required to store the synaptic data expands as the square of N, while the number of neurons increases linearly as a function of N. Once the input vector is applied in the form of N synaptic data signals, $I_{PROMPT}$, the network will seek a solution in the form of an output vector appearing on vertical conductors where the signal on each vertical conductor is a stable maximum or minimum. The neuron amplifiers may have an inhibit input to control the threshold of the amplifier so that its output will remain a steady minimum, until the input to the amplifier exceeds a threshold level. This will aid the network in reaching a stable state more quickly. While such an analog neural network will reach a solution in a minimum of time, it does not lend itself well to expansion for research purposes.

The ability to expand a neural network is achieved by an analog-digital hybrid architecture shown in FIG. 2 using a random access memory to store a matrix (N×N) of synaptic data bits having values of 1 and 0. To illustrate the ease with which the network may be expanded, it is illustrated as having already been expanded from M×M to N×N, where N=2M, by adding to a first RAM 1 a second RAM 2 where each RAM is N×M. A row address counter 3 responds to clock signals $\phi_1$ to advance the address of the memories row by row through N rows of synaptic information. The outputs of the two RAMs labeled $D_1$ through $D_N$ for each row control a set of N pass transistor switches $SW_1$-$SW_N$ to pass current through respective resistors $R_1$-$R_N$ when the controlling synaptic bit read is equal to one and to block current when the synaptic bit is equal to zero at each position $D_1$ through $D_N$.

The synaptic resistors are connected to a summing amplifier 4 where they are added. The sum is then sampled and held for each row of the RAM by an array 5 of integrating sample-and-hold devices S/H1, selected one at a time for each row of synaptic information processing switches. To accomplish that, a serial shift register advances a bit 1 in a pair of cascaded M-bit shift registers 6 and 7 in response to a clock signal $\phi_1$, where $\phi_1 = N\phi_2$, as shown in the timing of FIG. 2a. In that way the synaptic matrix sum for every row of the matrix is stored, one sum at a time, in successive ones of a linear array of sample-and-hold devices S/H1.

The address counter 3 is advanced by one to address the next row of synaptic information stored in the memory each time a sum from the amplifier is stored in a sample-and-hold device. At the same time, the clock signal $\phi_1$ shifts the bit 1 in the shift register to the next position, until the bit 1 has been shifted to the Nth position, and the Nth row of synaptic information has been read from memory to complete a matrix cycle. At that time, each sample-and-hold device in a position j in the array 5 holds a signal that is a function of the jth row of information. After a clock signal $\phi_1$ has been generated N times, a nonoverlapping $\phi_2$ pulse is generated, as shown in FIG. 2a, which completes a matrix cycle. Another cycle may then follow.

The signals from the first array 5 of sample-and-hold devices are passed by an array of neuron amplifiers $A_1$ through $A_N$, each having an INHIBIT input signal applied which sets their threshold value. The signals which are passed by the neuron amplifiers are then sampled and held by a second array 8 of nonintegrating sample-and-hold devices S/H2 at the time of initiating the next matrix cycle of synaptic information processing. The process is repeated for the next and each subsequent row, each time storing the results in the array of integrating sample-and-hold devices S/H1, and then transferring those results to the second array of nonintegrating sample-and-hold devices S/H2 at the start of the procedure for the next matrix cycle. FIG. 2b illustrates schematically the implementation of an integrating sample-and-hold circuit with a switch SW, RC circuit, and noninverting voltage follower VF. The entire process for all rows in the stored matrix of synaptic data is repeated, each time updating the signals stored in the nonintegrating sample-and-hold devices S/H2, until the output of the summing amplifier 4 becomes stable from one matrix cycle to the next of the entire process.

To enter a problem solving operation, an initial set of signals $I_{PROMPT\,1}$ through $I_{PROMPT\,N}$ is entered through the neuron amplifiers $A_1$ through $A_N$, and stored in the array of nonintegrating sample-and-hold devices S/H2. This is accomplished by generating a signal $\phi_2$ which enables all the sample and hold devices S/H2. Once the "prompt" is entered, it is removed from the neuron amplifiers. In terms of an associative memory, the "prompt" may be "clues" of information stored in the memory. The output of the integrating sample-and-hold devices S/H2, after system stability is reached, will be the best match to the "prompt" from all the data stored.

In summary, system operation is controlled by two clock signals, $\phi_1$ and $\phi_2$, with $\phi_1 = N\phi_2$, where N denotes the number of neurons N=2M. On each $\phi_1$ timing signal, a neuron amplifier is selected by the shift registers 6, 7 and its input is updated and sampled by integrating sample-and-hold devices S/H1. During the update process, the neuron input signal is determined as a function of a row of synaptic information which controls the transistor switches $D_1$-$D_N$ and the present neuron output state at the outputs of the nonintegrating sample-and-hold devices S/H2. This process is repeated for each row of synaptic information in the memory following each $\phi_1$ timing signal updating the sample-and-hold device S/H1 in turn as directed by the serial shift registers until all rows of the synaptic information have been processed. On each $\phi_2$ clock pulse, the neuron amplifier outputs (determined by their updated inputs and the inhibit signal) are sampled by the array of nonintegrating sample-and-hold devices S/H2, completing one matrix cycle. Thus the system cycle time is determined by the update $\phi_1$ timing signal rate, and the number of neurons.

An advantage of this architecture is that the physical interconnections of the synaptic matrix of FIG. 1 are not required, thus vastly reducing system complexity, which permits very large neural networks to be simulated. Although its use is contemplated for research, future developments in the use of the present invention can conceivably follow with minor modifications of the hybrid architecture disclosed. One such modification, already designed, fabricated and tested, is an expansion of the concept to accommodate three quantized levels of +1, 0 and −1, as shown in FIG. 3.

Figure 3:
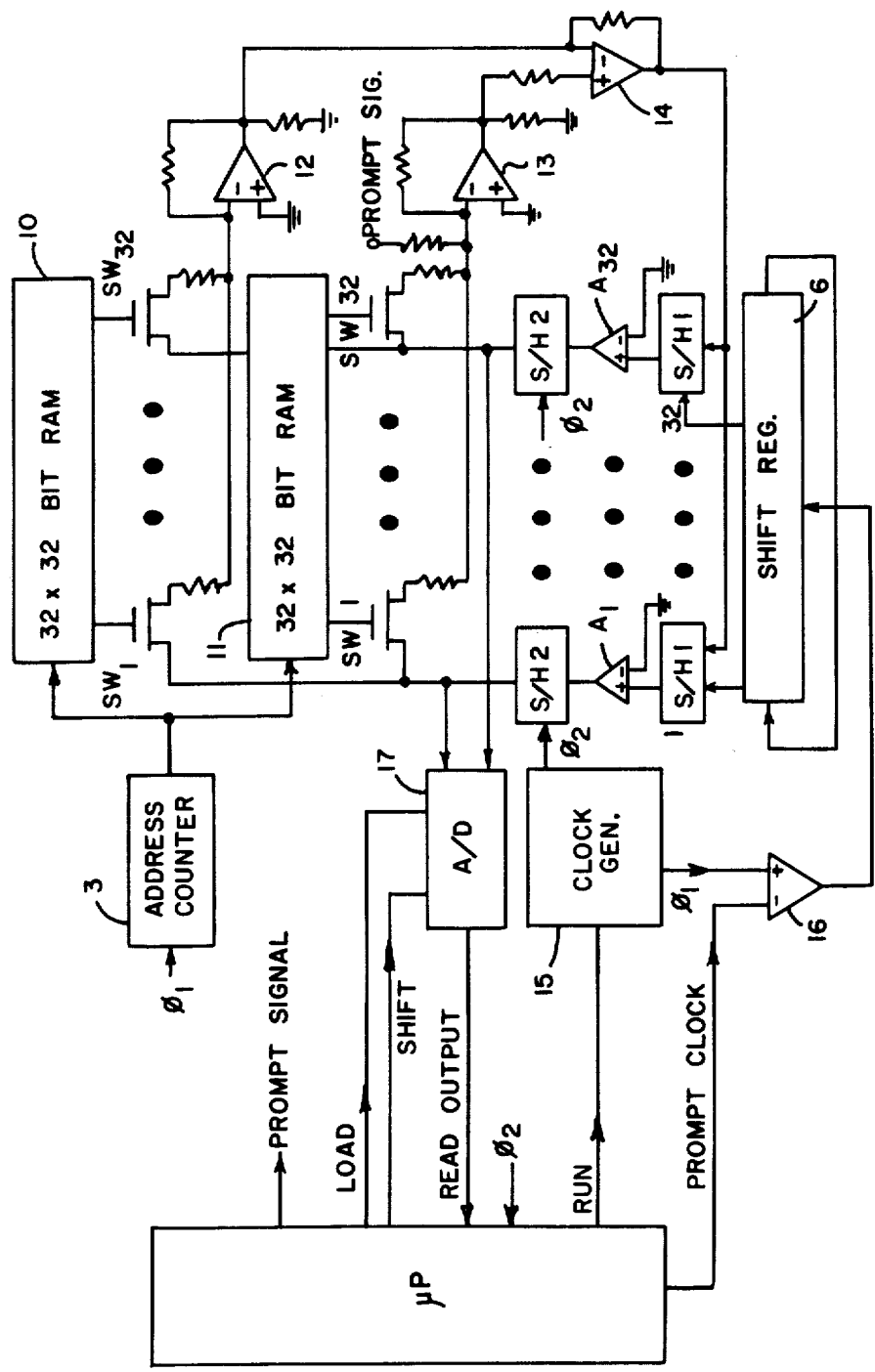
FIG. 3 is a schematic diagram of a neural network computer embodying the architecture of the present invention for trilevel synaptic information bits of 1, 0 and −1.

Referring to FIG. 3, a 32×32 memory 10 is used in the same way as the RAMs 1 and 2 of FIG. 2. That memory could be made up of two 32×16 memories, or could be expanded to a 64×64 memory with two 64×32 RAMs. However, in practice, a sufficiently large single RAM is selected, such as 256×256 or 1024×1024. This memory 10 stores the synaptic bits of value 0 and 1. A second memory 11 stores synaptic bits of value 0 and 1.

For each bit position of the memory 10 there is stored a bit value of 0 or 1, and for each bit 1 stored in memory 10, there must be stored at the same address of memory 11, a bit 0. Similarly, for each bit position of the memory 11, there is stored a bit value of 0 or 1, and for each bit 1 stored in memory 11, there must be stored at the same address of memory 10 a bit 0. Summing amplifiers 12 and 13 respond in the same manner as the amplifier 4 in FIG. 2, but their outputs are connected to separate terminals of a difference amplifier 14. The summing amplifiers are inverting operational amplifiers, so the amplifier 12 which sums the synaptic results of a bit 1 from the memory 10 is connected to the inverting (−) input terminals of the difference amplifier 14, and the amplifier 13 which sums the synaptic results of a bit 1 from the memory 11 is connected to the noninverting (+) input terminal of the difference amplifier 14. The architecture of the trivalue embodiment is otherwise the same as illustrated in FIG. 2. The components which remain the same are identified by the same reference characters. But note that the inhibit function, i.e., the setting of the threshold value for the neurons (amplifiers $A_1$-$A_N$) is now effectively obviated by allowing for negative values of synaptic information bits, and using the summing amplifier 13 to subtract the results of negative synaptic values from the results of positive synaptic values, thereby transferring the inhibit function to a point ahead of the sample-and-hold devices S/H1.

In summary, the architecture of FIG. 3 utilizes two memory blocks, one for implementing the excitation synapse function (response to synaptic data bits of value +1) and the other for implementing the inhibition synaptic functions (response to synaptic data bits of value −1). This allows a hybrid implementation of the Hopfield model disclosed in the U.S. Pat. No. 4,660,166 with each synaptic data bit of strength ($T_{ij}$) having a value of +1, 0 or −1. These synaptic strength values are readily programmed in the memories 10 and 11 to provide any synaptic matrix desired. Additional memory blocks, switches connecting resistors and summing amplifiers could be provided to increase the number of grey levels in the synaptic strength of each matrix (memory) location.

In operation, a neuron amplifier $A_1$ is selected by the output of the serial shift register 6, and the input of the neuron amplifier is sampled and held by its integrating sample-and-hold device S/H1. The input signal level during its update cycle is determined by the analog output states of the neuron amplifiers $A_1$-$A_{32}$ stored in nonintegrating sample-and-hold devices S/H2 during the previous $\phi_2$ clock signal, and the row of synaptic information appearing at the memory outputs which control the switches $SW_1$-$SW_{32}$ for the resistor connections. On each $\phi_2$ cycle, the neuron outputs, as determined by their updated input signal and threshold, are sampled and held by their output sample-and-hold devices S/H2, thus completing one iterative or system cycle. This process is repeated until all neuron amplifier outputs have been stabilized.

The hybrid architecture is ideally suited for simulating both continuous and discrete neural networks of the Hopfield model. In the continuous network, the input voltage of the ith neuron on the kth iterative cycle, $u_i(k)$, is given by $$u_i(k) = u_i(k-1) + \left[ \Delta t/\tau_i) \sum_j T_{ij}V_j(k-1) - u_i(k-1) \right]$$

where $\tau_i$ is the time constant of the neuron (amplifier i) as determined by the RC product of the neuron's input sample/hold device, $V_j$ is the analog output of the jth neuron (amplifier j) and $\Delta t$ is the input sampling time. In the discrete model, $u_i(k)$ is given by $$u_i(k) = \sum_j T_{ij}V_j(k-1)$$

The neuron output, $V_i(k)$, in all cases, is obtained from $$V_i(k) = f_i[u_i(k) - u_{io}]$$

where $u_{io}$ and $f_i$ are, respectively, the threshold and the transfer function of the comparator for the ith neuron.

The system cycle time is basically given by T = N $_1$. Thus, for a given N, the operation speed of the hybrid architecture is primarily governed by the sampling times. Moreover, in order to simulate a neural network accurately in the continuous model, the sampling time should be small compared to the time constant of the neurons. In the prototype system of FIG. 3, a conservative input sampling time of about 8 microseconds and a neuron time constant of one millisecond have been chosen. However, the architecture can be further optimized with custom VLSI chips to reduce the input sampling time to a microsecond so that for N=1000, a system cycle time on the order of a millisecond can be achieved.

In the implementation of this embodiment, a programming microprocessor $\mu$P controls operation by a signal RUN which enables a clock generator 15 to transmit $\phi_1$ timing signals to the shift register 6 via an OR gate 16 and the address counter 3, and to transmit $\phi_2$ timing signals to the sample-and-hold devices S/H2, and optionally to the microprocessor, which may be programmed to initiate another RUN signal that starts another clock generator cycle or, in the case of a free running clock generator, terminating the RUN signal to stop the clock generator until it is determined that the system should continue to run. In either case, the microprocessor may control a sample-and-hold A/D converter 17 having a multiplexer input and a serial shift register output, to convert the output of the sample-and-hold devices S/H2 in sequence from analog to digital form in order that the output be read into the microprocessor $\mu$P.

The microprocessor may then determine whether stability has been reached To allow for A/D conversion, reading the output, and time to compare the output read with an output previously read, the microprocessor may be programmed to hold off issuing another RUN signal, or in the case of a free running clock generator, interrupting the RUN signal while the comparison is made. Once it is determined that the system output has stabilized, the last output read is the information desired. It would also be possible to monitor the output of the amplifier 4 in FIG. 2 and the amplifier 14 in FIG. 3 to determine when stability has been reached This option would be used for visual monitoring through a volt meter connected to the amplifier output.

To enter a "prompt" by the programmed microprocessor, a PROMPT CLOCK is generated by the microprocessor before any RUN signal is generated. At the same time, a PROMPT SIGNAL is generated as a train of pulses applied through the amplifier 13 and amplifier 14 to the sample-and-hold devices S/H1. The clock generator 15 is then designed to generate an initial $\phi_2$ timing signal which transfers the distributed "prompt" signals into the second array of sample-and-hold devices S/H2.

In addition to the ease of expandability as compared to a fully parallel neural network hardware and improved speed with respect to most of the current software simulations, the hybrid neurocomputer provides extreme versatility in its configurability. Furthermore, like the software simulations, the operation of the hybrid neurocomputer can be "frozen" at any stage or at each iteration cycle to study the dynamic behavior of the neurons as the circuit updates.

The hybrid architecture is proving to be a very versatile and powerful neural network simulator in several different configurations for research. The performance of the 32-neurons prototype hybrid system has been tested for a variety of applications including associative memory with global and local inhibitions, destabilization of spurious states using asymmetric connections, and combinatorial optimization problems such as Map Coloring.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A hybrid analog-digital neural network comprising
    a first random access memory for storing an N×N matrix of synaptic information in the form of binary 1 and 0 digits,
    an array of N analog amplifiers for performing the neuron function of said network, said array of amplifiers being numbered 1 through N corresponding to columns of said matrix,
    a first array of N electronic switches, each having an input terminal, an output terminal and a control terminal, one switch for each column having its control terminal connected to receive a binary signal of said synaptic information matrix stored in said first memory to enable current to flow through the switch from an input terminal to an output terminal thereof,
    a first summing amplifier having input and output terminals and a first array of N resistors, one resistor for each of said switches, connecting said switches to the input terminal of said summing amplifier,
    a first array of N sample-and-hold devices for sampling and holding an output signal at the output terminal of said summing amplifier in response to a control signal, said array of N sample-and-hold devices having its output terminals connected to said array of analog amplifiers, each device being connected to a corresponding one of said amplifiers numbered 1 through N in sequence,
    means for generating first and second timing signals where said first consists of N timing signals for every one of said second timing signals,
    means for producing and sequentially applying said control signal to said first array of N sample-and-hold devices in response to said first timing signal, said first array of N sample-and-hold devices having its output terminals connected to said array of analog amplifiers, each device being connected to a corresponding one of said amplifiers numbered 1 through N in sequence,
    a second array of N sample-and-hold devices having its input terminals connected to said array of analog amplifiers for sampling analog signals in response to said second timing signals, each device being connected to a corresponding one of said amplifiers numbered 1 through N in sequence, and having its output terminals connected to said array of N electronic switches, each device being connected to a corresponding one of said switches numbered 1 through N in sequence, and
    means for addressing said memory one row at a time to read out in parallel one row of binary digits from said matrix at a time in response to N timing signals to enable said switches in response to said binary digits.

2. A neural network as defined in claim 1 wherein each of said analog amplifiers performing the neuron function of said network includes a second input terminal for receiving a prompt signal and a third input terminal for receiving an inhibit signal which sets a threshold level for the amplifier, every amplifier receiving said inhibit signal, and each amplifier receiving a distinct prompt signal.

3. A neural network as defined in claim 2 including an additional resistor connected to one of said first and second summing amplifiers, and means connected to said additional resistor for producing a prompt signal consisting of N binary 1 and 0 digits in series while said first array of sample-and-hold devices sample the output of said difference amplifier in sequence, thereby storing signals in response to said N prompt digits in said first array of N sample-and-hold devices.

4. A neural network as defined in claim 1 including a second random memory for storing an N×N matrix of binary 1 and 0 digits, where binary 1 digits represent a negative unit value and may not occupy a position in said second memory corresponding to a position occupied by a binary digit 1 in said first memory, said second memory being addressed in parallel with said first memory,
    a second array of N electronic switches, each having an input terminal, an output terminal and a control terminal, one switch for each column having its control terminal connected to receive a binary signal of said synaptic information matrix stored in said second memory to enable current to flow through the switch from an input terminal to an output terminal thereof,
    a second summing amplifier and a second array of resistors, one resistor for each of said switches, connecting each of said second array of switches to the input terminal of said summing amplifier, and
    a difference amplifier having first and second input terminals connected to output terminals of said first and second summing amplifiers, and an output terminal connected to said second array of sample-and-hold devices.

5. A neural network as defined in claim 1 including a microprocessor, wherein said first memory is addressed one row at a time in response to said first timing signals and said second array of sample-and-hold devices are enabled to sample in parallel by said second timing signal, and said means for generating said first and second timing signals is controlled to run by said microprocessor in response to a control signal.

6. A neural network as defined in claim 5 including means controlled by said microprocessor for monitoring said network to determine after each cycle of said second timing signal when stability has been reached in the operation of the network.

7. A neural network as defined in claim 6 wherein said monitoring means includes means for sampling in sequence and converting the output signals of said analog amplifiers after each matrix cycle for comparison with output signals from previous matrix cycles to determine when stability has been reached.

8. A neural network as defined in claim 7 including a microprocessor, wherein said first memory is addressed one row at a time in response to said first timing signals and said second array of sample-and-hold devices are enabled to sample in parallel by said second timing signal, and said means for generating said first and second timing signals is controlled to run by said microprocessor in response to a control signal.

9. A neural network as defined in claim 8 including means controlled by said microprocessor for monitoring said network to determine after each cycle of said second timing signal when stability has been reached in the operation of the network.

10. A neural network as defined in claim 9 wherein said monitoring means includes means for sampling in sequence and converting the output signals of said analog amplifiers after each second timing signal cycle for comparison with output signals from previous second timing signal cycles to determine when stability has been reached.

* * * * *